(12) United States Patent
Therrien et al.

(10) Patent No.: US 7,246,275 B2
(45) Date of Patent: Jul. 17, 2007

(54) METHOD AND APPARATUS FOR MANAGING DATA INTEGRITY OF BACKUP AND DISASTER RECOVERY DATA

(75) Inventors: David G. Therrien, Nashua, NH (US); James E. Pownell, Natick, MA (US); Adrian VanderSpek, Worcester, MA (US); Herman Robert Kenna, Harvard, MA (US); Ashok T. Ramu, Waltham, MA (US); Maxwell Joel Berenson, Westborough, MA (US)

(73) Assignee: Exagrid Systems, Inc., Westboro, MA (US)

( * ) Notice: Subject to any disclaimer, the term of this patent is extended or adjusted under 35 U.S.C. 154(b) by 312 days.

(21) Appl. No.: 10/659,128

(22) Filed: Sep. 10, 2003

(65) Prior Publication Data

US 2004/0093555 A1    May 13, 2004

Related U.S. Application Data

(60) Provisional application No. 60/409,684, filed on Sep. 10, 2002.

(51) Int. Cl.
*G11C 29/00* (2006.01)
*G06F 11/00* (2006.01)
*G06F 7/02* (2006.01)
*G06F 12/00* (2006.01)

(52) U.S. Cl. .................. 714/710; 714/718; 714/819; 714/6; 707/202

(58) Field of Classification Search ............... None
See application file for complete search history.

(56) References Cited

U.S. PATENT DOCUMENTS

| 4,843,633 | A | * | 6/1989 | Menich et al. ............ 455/422.1 |
|---|---|---|---|---|
| 5,852,713 | A | | 12/1998 | Shannon ................ 395/182.04 |
| 5,901,320 | A | * | 5/1999 | Takahashi et al. ........... 717/170 |
| 5,919,247 | A | * | 7/1999 | Van Hoff et al. ........... 709/217 |
| 6,088,694 | A | | 7/2000 | Burns et al. .................... 707/8 |
| 6,202,070 | B1 | * | 3/2001 | Nguyen et al. .......... 707/104.1 |
| 6,272,536 | B1 | * | 8/2001 | van Hoff et al. ............ 709/217 |
| 6,324,661 | B1 | * | 11/2001 | Gerbault et al. ............ 714/718 |
| 6,324,669 | B1 | * | 11/2001 | Westby ...................... 714/805 |
| 6,393,516 | B2 | | 5/2002 | Johnson ...................... 711/111 |
| 6,615,219 | B1 | * | 9/2003 | Bruso et al. ................ 707/102 |
| 6,658,048 | B1 | * | 12/2003 | Valio ........................... 375/150 |
| 6,889,247 | B2 | * | 5/2005 | Christie et al. ............. 709/205 |
| 6,904,547 | B2 | * | 6/2005 | Gittins et al. ................. 714/54 |
| 2003/0023933 | A1 | * | 1/2003 | Duncan ...................... 714/807 |
| 2004/0057505 | A1 | * | 3/2004 | Valio .......................... 375/148 |

* cited by examiner

*Primary Examiner*—Phung My Chung
(74) *Attorney, Agent, or Firm*—Mintz, Levin, Cohn, Ferris, Glovsky and Popeo, P.C.

(57) ABSTRACT

The present invention relates to a computer primary data storage system that integrates the functionality of file backup and remote replication to provide an integrated storage system that protects its data from loss related to system or network failures or the physical loss of a data center.

14 Claims, 6 Drawing Sheets

Sample Protected Storage Grid deployment

Figure 1: Sample Protected Storage Grid deployment

Figure 2: protection policy

FIG 3: Repository Nodes within Repositories

Fig. 4

| | |
|---|---|
| General | Policy Identification |
| CIFS Sharing | Share: GP_Marketing/Marcom2 |
| NFS Sharing | Protect this share: ☑ |
| FTP Sharing | Protection Policy Name: marcom2 |
| Protection Policy | Description: 2 Local, 0 Remote |
| | User Data: D135 |

13 → Protect this share
14 → Protection Policy Name

Protection Management

Backup Frequency: 1 Hour

15 → Replicas: 2 Replicas in New York/Hudson
1 Replicas in New York/3 Charles
0 Replicas in Boston 16 → Version Management

17 → Keep Version History ☑
Version Compression: Delta Compression
18 → Version Compaction:
☑ Keep only one daily version after 7 days
☑ Keep only one weekly version after 4 weeks
☑ Keep only one monthly version after 12 months
19 → ☑ Keep only one version after 2 years

Advanced Options [Hide]

20 → ☐ Purge all versions of files that are deleted from this share 7 days after they are deleted.
21 → Caching Level: High FIG 4: Protection Policy FIG 5: Integrity checking and correcting job FIG 6: Apparatus and modules used to protect data to a local repository FIG 7: Inter-repository replication

METHOD AND APPARATUS FOR MANAGING DATA INTEGRITY OF BACKUP AND DISASTER RECOVERY DATA

CROSS-REFERENCE TO RELATED APPLICATIONS

This application claims priority to, and the benefit of, U.S. Provisional Application Ser. No. 60/409,684 filed, Sep. 10, 2002, entitled "System and Method for Consolidated Storage and Data Protection," and incorporated herein by reference in its entirety. This application is also related to: U.S. patent application Ser. No. 10/659,129 filed Sep. 10, 2003, entitled, "METHOD AND APPARATUS FOR INTEGRATING PRIMARY DATA STORAGE WITH LOCAL AND REMOTE DATA PROTECTION" U.S. patent application Ser. No. 10/658,978 filed Sep. 10, 2003, entitled "METHOD AND APPARATUS FOR STORAGE SYSTEM TO PROVIDE DISTRIBUTED DATA STORAGE AND PROTECTION;" and U.S. patent application Ser. No. 10/659,642 filed Sep. 10, 2003, entitled "METHOD AND APPARATUS FOR SERVER SHARE MIGRATION AND SERVER RECOVERY USING HIERARCHICAL STORAGE MANAGEMENT" each of which is incorporated herein by reference in its entirety.

BACKGROUND OF THE INVENTION

The present invention relates to a computer primary data storage system that integrates the functionality of file backup and remote replication to provide an integrated storage system that protects its data from loss related to system or network failures or the physical loss of a data center.

Traditional primary disk storage systems are comprised of disk drives attached to an I/O channel or a redundant arrays of independent disks (RAID) controller apparatus. Although many of these systems use microprocessors to coordinate the handling of requests from clients/servers and for performing RAID data protection, they were not designed to subsume the functionality of traditional data protection systems and software like magnetic tape-based backup. RAID data protection systems only manage data at the sector/block level and have no knowledge of which collection and which order of these blocks comprises a file, so they cannot perform file-level integrity checking of data.

By far, the most common form of magnetic disk data protection is the periodic backup of its data onto magnetic tape. There are many issues associated with magnetic tape based data protection schemes:

Magnetic tape has not been able to maintain the same cost per gigabyte reductions that magnetic disk drives have over the past 17 years. In 1985, magnetic tape storage was about thirty-five times less expensive than magnetic disk, making it a cost-effective choice as a backup storage medium. In 2002, magnetic disk drives were only about twice as expensive as magnetic tape. This trend is expected to continue into the future when it may be more costly to store data on magnetic tapes as compared with magnetic disks.

Magnetic tape has historically demonstrated low reliability and this translates into low customer confidence in being able to restore data from tape. There are many reported instances of poor tape reliability which translates to unsuccessful data restores. As an example, the Jan. 29, 2003 issue of ComputerWorld provided the following quote of a network administrator at a major New York-based financial services company: "85% of my company's backups contained major errors that made the recovered data either totally unusable or incomplete."

One of the reasons for poor recoverability of data stored on tape is related to the wear-out mechanisms between tape drive heads and the media itself. When tape media contacts a tape drive head, both the media and the drive heads experience friction and wear. Even with a single tape, the quality of the recording varies, based on the state of the tape drive head and the magnetic tape at the time of the recording.

Because tape media quality diminishes over time, storage administrators must refresh their tapes periodically. This involves copying data from the older tape onto a new tape. This is a very time consuming process, with each tape taking multiple hours to complete a copy. For this reason, the process is rarely performed.

There are many incompatible magnetic tape and tape drive technologies. Even within a product line from a single vendor, there are older versions of tape that are not readable by that vendor's latest tape drives. Once a technology is selected by a customer and is used for many years, it is difficult for that customer to change to a different tape technology. Typically, large repositories of tapes either have to be migrated to the new tape technology or the customer's administrator typically must maintain multiple incompatible tape drive systems.

The archive environmental requirements for magnetic tape are more restrictive than magnetic disk. When tape is subjected to environmental changes that occur during media transport to an offsite storage facility, the reliability and readability of the data on the media is diminished from that time forward. The following table shows the relative archive environmental limits for both magnetic tape and magnetic disk technologies.

|  | Magnetic Tape | Magnetic Disk |
| --- | --- | --- |
| Archive Temp (C.) | 18–28 degrees C. | −40 to 65 degrees C. |
| Archive Humidity (%) | 40–60% | 5–95% |

It takes significant administrative effort to manage removable media with today's magnetic tape and optical disk solutions. An administrator typically must manually move these media from online jukeboxes to offline shelves and possibly to offsite storage locations. The greatly varying environmental conditions that tapes are subjected to during shipment to offsite locations as well as the associated shock and vibration associated with handling and shipping tape media work together to reduce the reliability and availability of tape-based data.

When magnetic tape must be used to recover data after the failure of a computer system or loss of an entire site, the recovery process can take days or even weeks to complete. Storage administrators must review backup catalogs, recover sets of tapes from local or offsite storage facilities, and rebuild a tape-based recovery infrastructure with servers, tape library units, and backup software. Next, they must reload all required tapes, and if necessary, respond to any tape media and tape drives failures that inhibit all data from being recovered successfully.

The use of backup software contributes to significant tape media costs due to over-replication of data. Each week, most companies perform full backups and maintain as much as a years worth of these full backup tape sets. Typically each full backup tape set will contain greater than 80% of the same content as the last full backup. So after a year, the customer has over 50 tape sets of mostly replicated data.

It is difficult to eliminate or recycle tapes from a large tape archive. Critical content that must be preserved resides on the same tape medium with content that does not need to be maintained any longer. For this reason, tape archives expand beyond reasonable administrative control.

It is impossible to ascertain the quality of data on specific magnetic tapes within an archive without placing each tape into a tape drive and reading that tape from beginning to end. It may take hours to complete the scan of one tape alone. This is a time-consuming process and even when data is found to be damaged, there is typically no way to replace the damaged data with known, good data.

To the extent that disk-based data protection systems exist, a need remains for a comprehensive and cost-effective data back-up system that allows a user to effectively adjust their back-up strategies as their needs change and that ensures the integrity of the data that is backed-up.

SUMMARY OF THE INVENTION

The present invention relates to a computer primary data storage system that integrates the functionality of file backup and remote replication to provide an integrated storage system that protects its data from loss related to system or network failures or the physical loss of a data center.

One embodiment of the invention provides a method for managing integrity of a file. The method includes at a first time, performing a content checksum of a file in a first repository node to obtain a first checksum and storing the first checksum in the first repository node. At a second time, the method re-performs the content checksum on the file to obtain a second checksum and compares the second checksum with the first checksum. If the second checksum does not equal the first checksum, then at a node with a replica, the method verifies the replica. If the replica is verified, then the method transmits the verified replica to the first repository node; and replaces the file with the verified replica. If the replica is not verified, the method determines if all other repository nodes with replicas have been checked. If not, then the method selects a node with an alternative replica that has not been verified and verifies the alternative replica.

If the alternative replica is verified, then the method transmits the verified alternative replica to the first repository node and replaces the file with the verified alternative replica. If all other repository nodes with replicas have been checked and no verified replicas have been discovered, then the method determines that file integrity correction failed.

BRIEF DESCRIPTION OF THE DRAWINGS

FIG. 4 shows one embodiment of the protection policy user interface that allows storage administrators to define the protection policy of FIG. 2.

DETAILED DESCRIPTION OF THE DRAWINGS

Figure 1:
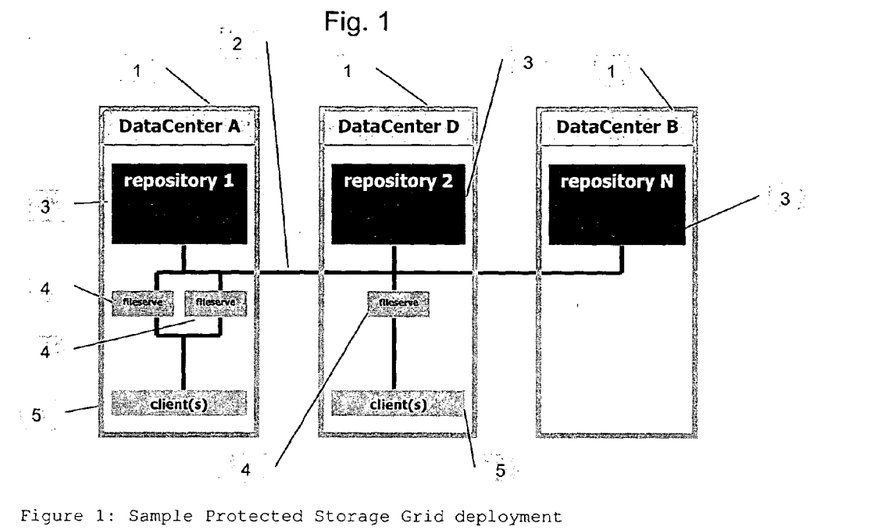
FIG. 1 is a schematic diagram of a typical deployment of the invention across three data centers.

FIG. 1 is a diagram that illustrates the invention of an integrated primary data storage and data protection system. Fileservers 4 provide primary data storage capacity to client systems 5 via standard network attached storage (NAS) protocols like NFS, CIFS and FTP. The apparatus is designed to operate among two or more data centers 1. Two or more repositories 3 deployed across these data centers provide storage capacity and data management processing capability to deliver complete data protection for their associated fileserver primary storage systems. The apparatus leverages metropolitan or wide area internet protocol (IP) networking 2 to allow repositories to send and receive data for replication. By having data replicated to a local and at least one remote repository from the originating fileserver, these repositories act as a replacement for traditional on-site and off-site tape storage systems and tape vaulting services. In the event of a site disaster, all fileservers that were lost are recovered by deploying new fileservers at a surviving site and recreating the content of the failed fileservers from the content in the surviving repositories.

Figure 2:
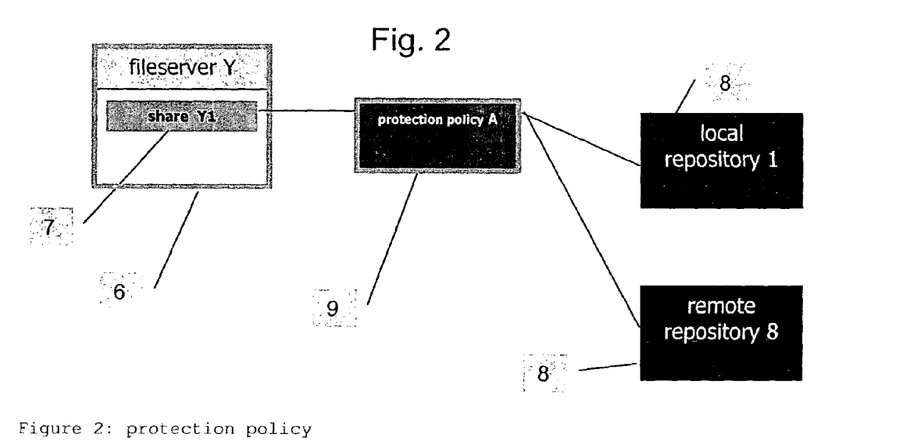
FIG. 2 is a schematic diagram depicting a relationship between a protection policy, a fileserver share and associated repositories similar to those shown in FIG. 1.

FIG. 2 is a diagram that illustrates an association between a fileserver 6 and two repositories 8 that are deployed across data centers. All primary data storage activity occurs between one or more clients and one or more fileservers through a NAS share 7. A fileserver is typically configured to have tens of shares. These shares allow the primary storage capacity of the fileserver to be shared and securely partitioned among multiple client systems.

A share is created on a fileserver as a directory or folder of storage capacity. The contents of this shared directory or folder is accessible by multiple clients across a local area network. For example, in the Microsoft Windows environment, CIFS shares appear as storage folders within LAN-connected servers under "My Network Places" of the Windows Explorer user interface. For UNIX environments, shares are accessed through mount points which define the actual server and folder where data will be stored as well as a virtual folder that appears to be part of the local client system's filesystem.

Because this apparatus is both a primary data storage and data protection system, the storage administrator defines how each share of a fileserver will be protected across two or more repositories through the creation of a unique protection policy 9 for that share. In one embodiment, this protection policy defines which repositories the system will use to protect each share's data. In one embodiment it also defines how often data protection will occur, how many replicas will be maintained within each repository based on the criticality of a share's data, and how updates and modifications to share data should be maintained. On a periodic basis, each fileserver examines the protection policy for its shares and when appropriate, the fileserver captures all recent changes to a share's files and stores/protects these files within two or more repositories.

Figure 3:
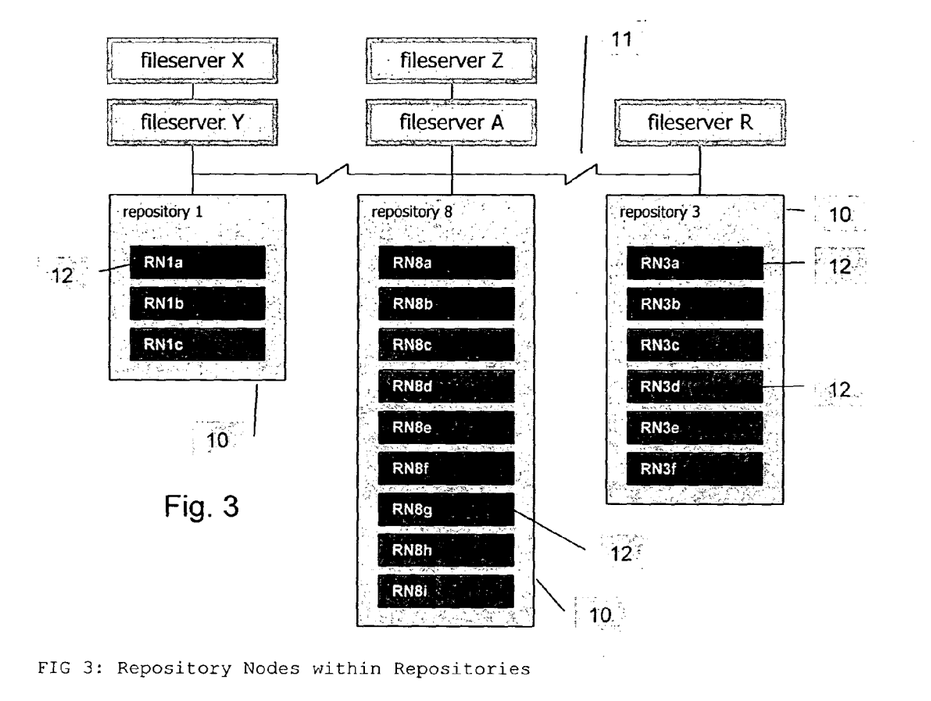
FIG. 3 is a schematic diagram of three repositories, similar to those shown in FIG. 1, with associated repository nodes according to one embodiment.

FIG. 3 is a diagram that shows three repositories 10 that are remotely connected to each other via metropolitan or wide area networking 11. Each repository has two or more repository nodes 12. Each repository node has the processing power to perform integrity checking on all of its files, to delta or file compress its files, to maintain version chains for each file and to compact files.

Compaction provides a means of removing versions of files based on the version's age. For example, a compaction option for a file share may be configured to maintain only one monthly version of a file after a year, one weekly version of a file that's older than 6 months and one daily version of a file that's older than 1 month. All "extra" versions can be automatically purged from a repository node, which, in turn, creates more storage capacity for new versions of files.

Each repository node interacts with other repository nodes in order to replicate or re-replicate files that failed their integrity check or are now unavailable because a repository node's disk drive, a repository node or an entire repository has failed.

FIG. 4 is a screenshot of one embodiment of the present invention's protection policy. There is a unique protection policy defined for each share of each fileserver. Before arriving at the protection policy screen, a storage administrator creates a share and allows it to be accessible by CIFS and/or NFS and/or FTP. Once a new share is created, the protection policy screen is displayed. Within this screen, the storage administrator can specify the following data protection parameters:

Protect this share 13—this checkbox is normally checked indicating the data in this share should be protected by repositories. There are certain client applications that might choose to use a fileserver for primary storage, yet continue to protect data using third party backup or archiving products. If this checkbox is left unchecked, all other options in the protection policy user interface are disabled.

Protection Management—Backup Frequency 14—this option determines how often a fileserver share's data will be protected in the local and remote repositories. In one embodiment, the backup frequency intervals can be selected from a list of time intervals which include: 15 minutes, 30 minutes, 1 hour, 2 hours, 3 hours, 4 hours, 6 hours, 8 hours, 12 hours and 24 hours. All backup frequency intervals are anchored to 12:00 midnight of each fileserver's local time-zone. Setting the backup frequency to 24 hours is similar to performing traditional daily incremental backups. Setting this interval to 15 minutes allows versions of files that change often during the day to be protected on 15 minute intervals. Only files that have changed since the last backup occurred are saved in repositories.

Protection Management—Number of replicas per repository. This feature allows a storage administrator to determine how many replicas 15 of data to create within each repository 16 when a share is protected. Minimally, there must be one replica stored in a repository that is local to the share's fileserver. It's possible to maintain multiple replicas within a single repository. In this case, replicas are maintained on different repository nodes of a repository to ensure continued access to a replica in the event of a single repository node failure or network failure. The location and number of replicas can be changed over time. To increase data availability for data that is increasing in criticality, more replicas per repository and additional repositories may be specified. For data that is decreasing in importance, fewer replicas may be maintained in the repositories, which makes more storage capacity available to other shares that are also using those repositories.

Version Management—Keep Version History 17—this checkbox should be checked for shares whose file content is regularly being updated. When checked, the specified repositories will maintain a version chain of all changes that were identified at each backup frequency interval. For shares of data that have unchanging file content, this checkbox can be unchecked.

Version Management—Version Compression 18—the three compression options are to not compress, to reverse delta compress or to apply simple file compression to a share's files. Delta compression typically provides the highest compression ratio for shares whose files are regularly being modified.

Version Management—Version Compaction 19—compaction provides a means of removing versions of files based on the version's age. For example, the version compaction option for a file share may be configured to maintain only one monthly version of a file after a year, one weekly version of a file that's older than 6 months and one daily version of a file that's older than 1 month. All "extra" versions can be automatically purged from repositories, which, in turn, makes more storage capacity available for new versions of files.

Advanced Options—Purge on Delete 20—this option, when checked will cause files that are deleted from a fileserver's share to also be purged from repositories as well. This feature is effective with applications like third party backup, where some of the replicas and versions that are being retained by repositories are no longer needed to satisfy a that application's recovery window and may be purged from all repositories.

Advanced Options—Caching Level 21—this allows the storage administrator to set the approximate percentage of client data that will be cached on a fileserver. Normally, this option is set to "Optimize for Read" to allow the maximum number of most-recently accessed files to be available to client applications at the highest performance levels. All least recently used data is maintained in two or more repositories. Conversely, the caching level can be set to "Optimize for Write", which reduces the amount of cached data available to clients but provides consistently high levels of available storage capacity for write applications, i.e., for receiving data. These application include third party backup applications. In this mode, by aggressively moving data off of a fileserver into repositories, the application sees the fileserver as a storage device with virtually infinite capacity.

Figure 5:
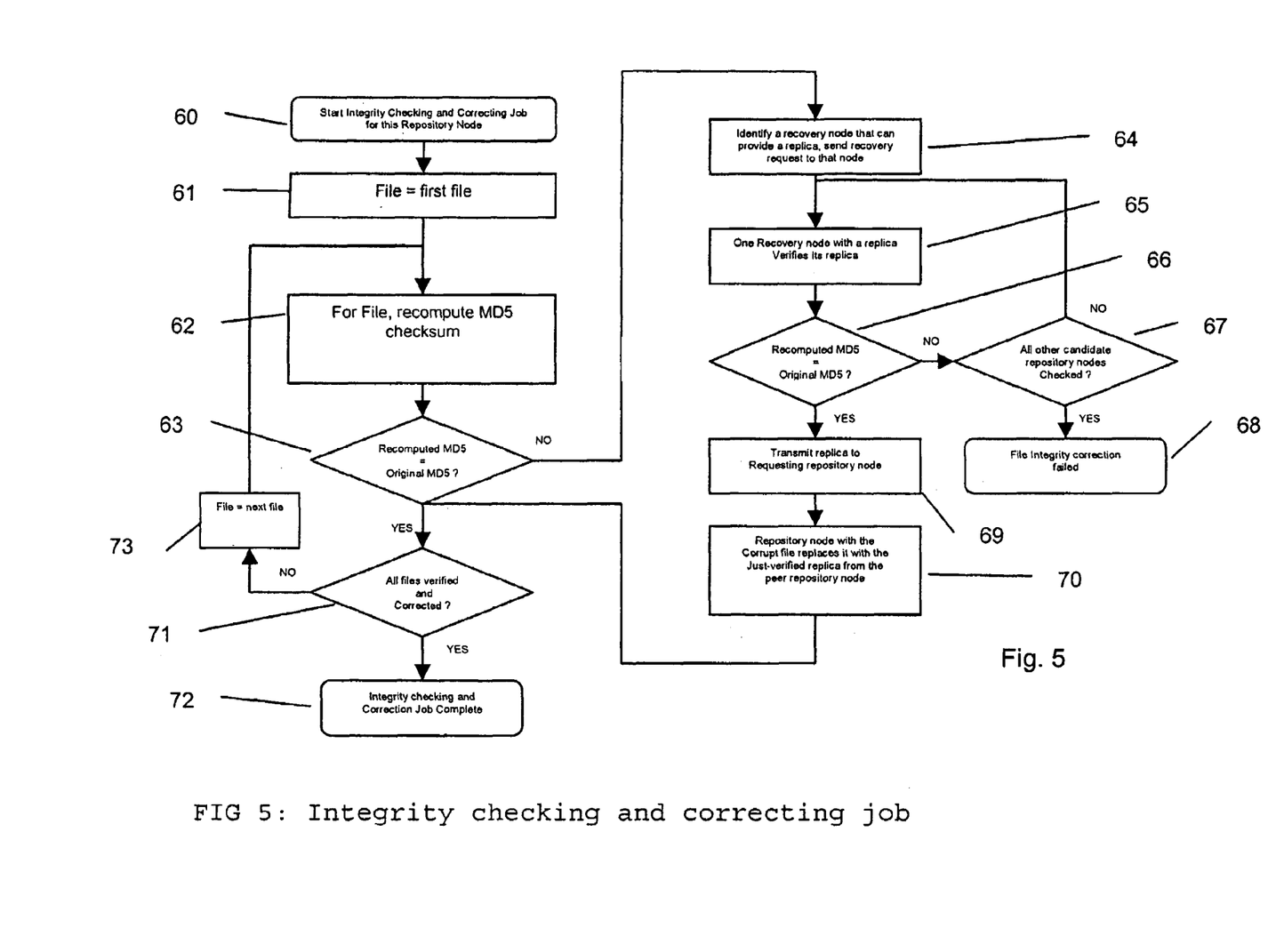
FIG. 5 is a flow chart of one embodiment of a method of managing the integrity of a file stored in the system of FIG. 1.

There are five periodic data management jobs that are run in each repository node:
1. File Integrity checking and correcting job
2. Repository node disk drive recovery job
3. Protection policy compliance job
4. Version restoration and decompression
5. Capacity Rebalancing The first data management job is related to checking files and correcting each file that has become corrupted. FIG. 5 shows the procedure for performing periodic file integrity checking and correcting of files in each repository node. In one embodiment, when a file is first placed into a repository node, a metafile is created which contains the MD5 content checksum of that file. Also included in this metafile is the location of all other repository nodes that have a replica of that file. If either a file or its content checksum become corrupted, that repository node, i.e., the primary node, contacts one of the other repository nodes that contain a replica. Priority is given to repository node replicas that are geographically local to the primary node. The repository node that contains a replica of the corrupted file first checks its own replica for data integrity, and if the file has not been corrupted, that replica replaces the corrupted replica in the primary node. This replacement process occurs each time a single file is detected to be corrupted. In one embodiment, all files for each repository node are checked at least once a month.

More specifically and with reference to FIG. 5, one embodiment of a method for managing the integrity of a file or a file system begins with starting 60 an integrity check and correction job for a first repository node. The primary node sets the file being checked 61 to the first file in the file system. As noted above, when files are first placed into the primary node, a content checksum, e.g., an MD5 checksum is determined to produce a first checksum and the first checksum is stored in the primary node. During the integrity management process, i.e., an integrity checking and correction job, the primary node performs a second checksum and compares 63 the second checksum to the first checksum.

If the second checksum is not equal to the first checksum it is an indication that either the file or the first checksum is corrupted. In response, the primary node identifies 64 the other repository nodes that maintain a replica of its corrupted file. When there is more than one other repository node to select a replacement file from, the primary node selects one that is on the same LAN if it exists before selecting more distant repositories. A recovery node with a replica verifies 65 its replica. In one embodiment, the recovery node with a replica performs a content checksum on the replica to produce a replica checksum and compares the replica checksum to the first checksum.

If the replica checksum does not equal the first checksum, the process determines 67 if all other repository nodes have been checked. If so, the process determines 68 that the integrity correction process failed. However, if there are other nodes to check, the process returns to step 64.

On the other hand, if the replica checksum does equal the first checksum, then the repository node with the verified replica transmits 69 the verified replica to the primary or requesting node. The primary node then replaces 70 the potentially corrupt file with the just-verified replica provided by a peer node.

Having replaced a potentially corrupt file with a just-verified replica, in one embodiment the process next determines 71 if all files have been verified and, if necessary, corrected. Similarly, if at step 63, the second checksum is equal to the first checksum, the process next determines 71 if all files have been verified and, if necessary, corrected. If so, the process determines 72 that the integrity management process is complete. Otherwise, the process sets the file for processing equal to the next file to be checked and the process returns to step 62, i.e, the process performs a second checksum on the file being processed.

Those of skill in the art will appreciate that certain variations to the method described above are possible. For example, if none of the replica checksums equal the first checksum. The first checksum may have been corrupted and the first checksum may be recomputed and compared to the replica checksums as an indication that the first checksum may have been corrupted.

The second data management job performed by each repository node is related to recovering from a disk drive failure within a repository node.

If a disk drive of a repository node fails, all of the files that it once maintained must be recreated on another disk drive within that repository. The repository with the failed disk drive contacts all other repository nodes and requests that they participate in the recovery of all of the missing files to surviving repository nodes of the repository where the disk drive failed. All repositories make lists of files to be transmitted to the repository with the failed disk drive. All of the repository nodes of the repository with the failed disk drive act as potential destinations for the data that will be sent from the repositories that have recovery data. A successful recovery has all of the data that was on the failed drive replicated among one or more repository nodes of the same repository.

If one or more repository nodes fail, the same process occurs, but on a larger scale. Surviving repository nodes collaborate to re-replicate all lost data other repository nodes of the repository with the hardware failure.

The third data management job performed by each repository node is associated with reacting to changes that are made by storage administrators for their shares' protection policy. If a storage administrator changes one or more options of a protection policy, the protection policy compliance job running within each repository node is responsible for purging, replicating, compressing and compacting its data to bring the policy into compliance. Here are some examples of policy changes and the associated repository node and inter-repository node actions that ensue:

If a storage administrator increases a protection policy's number of replicas per repository, each of the repository nodes of that repository collaborate to replicate content among each other to increase the replica count. Conversely, if the replica count decreases, they collaborate to reduce the number of replicas by selectively deleting file replicas.

If a storage administrator adds a new repository to the policy, the repository nodes that already store a replica of that data collaborate with repository nodes associated with the new repository to replicate their content to the new location. All data is verified before replicating it to the new repository to prevent corrupted data from being replicated.

If a storage administrator changes a protection policy to reduce the number of replicas in a repository, the repository nodes of that repository work in parallel to delete the proper number of replicas.

If the "Keep version history" option is changed from checked to unchecked, all earlier versions of a file in each of the repository nodes that maintains that version chain reclaim that space by deleting all but the latest version of a file.

If the data compression option is changed from no compression to either delta compression or file compression, all versions and replicas associated with that data will be compressed accordingly. Conversely, if the delta compression option is changed from having compression enabled to disabling compression, all compressed versions would be uncompressed by each of the affected repository nodes.

If compaction is enabled or the time period changes for any the daily, weekly or monthly compaction options in the Protection Policy, each repository node that has versions that must be deleted performs the requested file deletion while maintaining the integrity of each file's version chain.

If the purge on delete function is enabled, all future fileserver delete actions result in the deletion of that file's replicas and versions among the repository nodes.

The fourth data management job performed by each repository node is associated with requests by fileserver users to restore a recent or earlier version of one or more files. As files are modified by users over time, these changes are linked together within repositories into version chains. If the delta compression option was selected for within the protection policy for a share, the repository node is responsible for applying reverse delta decompression techniques from the latest version of a file backward through all delta compressed versions until the requested file is reached. If file compression was selected in the protection policy, the repository node is responsible for decompressing any requested file.

The fifth data management job performed by each repository node is related to capacity rebalancing. Over time, the capacity of some of the repository nodes will approach 100% consumption. When this occurs, a capacity rebalancing job is initiated to move version chains of files from one repository node to another within the same repository. This allows the capacity of the repository to be viewed from fileserver shares as an aggregate of virtual storage capacity.

Figure 6:
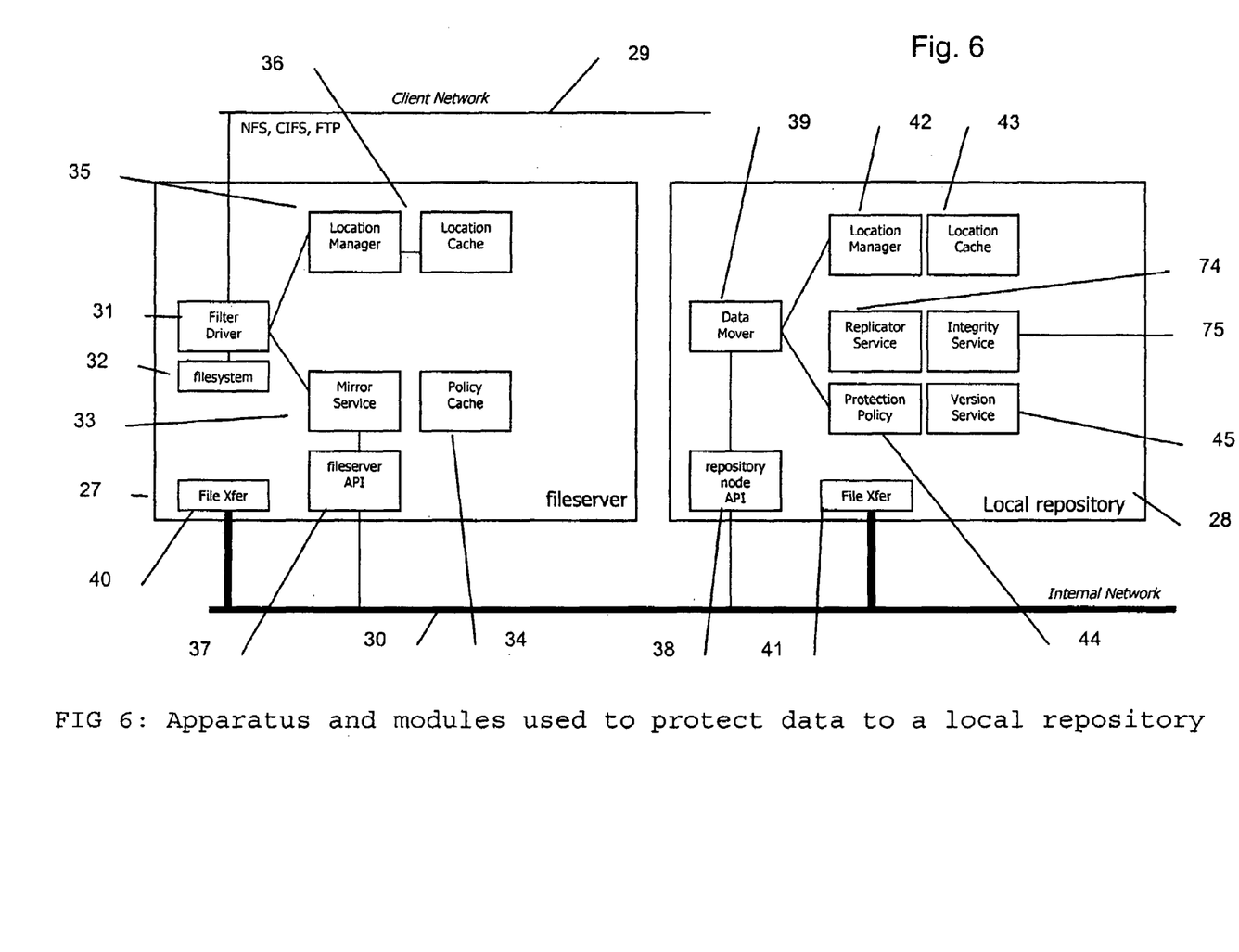
FIG. 6 shows one embodiment of the apparatus and the software components that are used to protect new client data to a local repository node.
Figure 7:
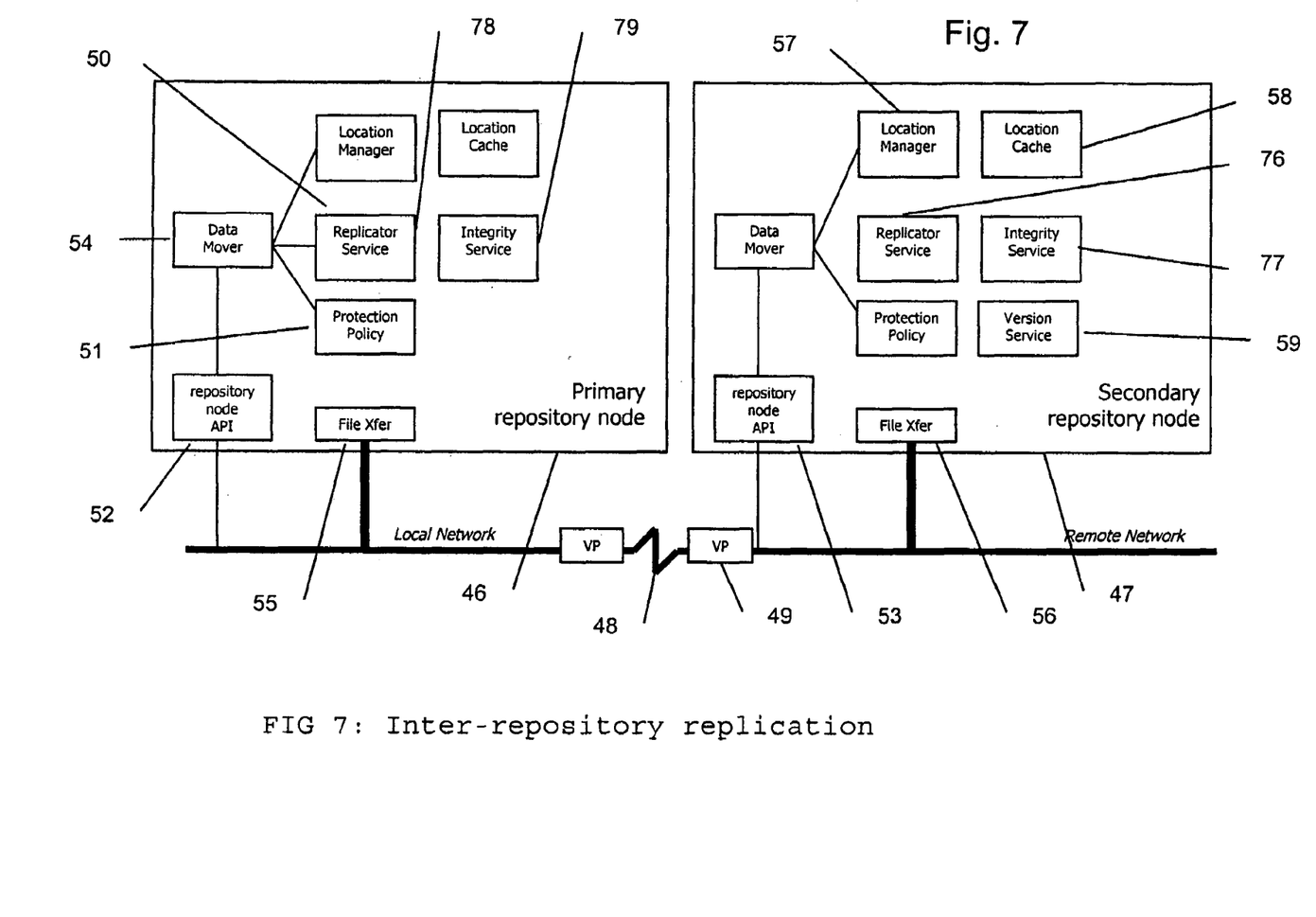
FIG. 7 shows one embodiment of the apparatus that replicates data among repositories.

FIG. 6 and FIG. 7 illustrate one embodiment of modules used to protect data files created by a client using a local repository and a remote repository. FIG. 6 displays one embodiment of the apparatus and software modules of the present invention that is associated with protecting client files to a local repository. The apparatus includes a fileserver 27 and a single local repository node 28. Clients access a fileserver via the client IP-based (Internet Protocol) network 29 and communicate with the fileserver using NFS, CIFS or FTP protocols. All fileservers and all repository nodes are interconnected by an internal IP-based (Internet Protocol) network 30. Current client files reside on a fileserver's filesystem 32.

In one embodiment, all input/output activity initiated by client file requests is intercepted by the filter driver 31. The fileserver software maintains a list of all modified or created files since this last snapshot occurred. A snapshot is a replication of a set of data at a particular point in time. Snapshot intervals can range from 15 minutes to 24 hours, based on the backup frequency 19 of the protection policy. On the schedule of the backup frequency, one embodiment of the mirror service 33 prepares all modified files in a share to be put into the repositories 21 (shown in FIG. 3) that are specified in that share's protection policy. The protection policies are stored and replicated across multiple repositories, and they are cached and regularly updated within each fileserver in the protection policy cache 34. For example, if a share's protection policy has its backup frequency set to one hour, on the transition to the next hour, the mirror service 33 initiates a backup of all changed files in the last hour to a local repository 28. For all new files, any repository node of the local repository can be used to hold a replica of a file. For files that have been modified, the mirror service directs new versions of the existing file to the same repository node as prior versions of that file. The mirror service queries the location cache 36 to determine which repository node should receive an updated version of an existing file. This location cache is updated regularly by the location manager 35 when the fileserver writes files to specific repository nodes. Once the location manager identifies all destination repository nodes for each file of a share for the latest collection of updated or created files, the fileserver communicates to each local repository via a fileserver API 37 and a repository node API 38. Each repository node's data mover 39 supervises the replication of files from the fileserver to its repository node. The fileserver file transfer module 40 transfers files from the fileserver filesystem to each repository node's file transfer 41 module. Once the files are replicated to specific disk drives within a repository node, its location manager 42 updates its location cache 43 with repository node location information. For all files that arrive at a repository node that are modified versions of existing files, the share's protection policy 44 version management settings are reviewed to determine whether new versions should be compressed and whether older versions should be maintained. The version service 45 is responsible for managing all policy-based compression and decompression, and purging versions based on the "keep only one version" option of a share's protection policy.

At this point in the description, client data is only replicated to a local repository. FIG. 7 illustrates one embodiment of modules that implement a process that protects data to one or more remote repositories to completely protect client data from site disaster. FIG. 7 displays a local repository node 46 that, from the actions described in FIG. 6, holds the first replica of data. FIG. 7 also shows a remote repository node 47. These are connected to each other across a metropolitan or wide-area network 48. In one embodiment, all data that is transferred between local and remote repositories may be secured by virtual private networking (VPN) 49 encryption. The local repository node's replication service 50 is responsible for reviewing the protection policy 51 for all files that were just created as part of the recent fileserver backup. Each repository node acts as a peer of other repository nodes. Based on the protection policy each repository node manages the movement of files among all repository nodes using repository node APIs 52, 53, data movers 54, and file transfer modules 55, 56. Once the data is replicated to remote repositories, the location manager 57 of each repository node updates the location cache 58 to track where files are maintained within that repository node. The version service 59 of the remote repository node manages file version compression, and compaction according to the protection policy.

In FIG. 7, there are two services that manage integrity checking and correction. The integrity service 79 of the primary node is responsible for the scheduling and execution of integrity checking jobs for that primary repository node. Each repository node has an integrity service, e.g., remote node integrity service 77, and all of these operate in parallel to check their own data. When a data corruption problem is detected by the integrity service, it uses its local replicator service 78 to manage the movement of the replacement file from another repository node to itself.

Thus the present invention relates to providing a highly reliable, self-healing, distributed magnetic disk-based data storage system that replaces traditional tape-based data protection systems. Each node of this distributed storage system has intelligence to carry out actions that are traditionally associated with backup and disaster recovery data management systems. In addition, it is capable of performing data management functions that are not possible to perform with traditional tape-based data protection systems.

Embodiments of the present invention provide an integrated data storage and data protection system that is physically deployed across two or more data centers. A deployment of the apparatus within each data center includes one or more fileservers and one or more repositories. The fileservers provide primary disk storage capacity to IP-networked clients via NFS, CIFS or FTP protocols.

Each repository is a virtualized pool of disk storage capacity that acts as a replacement for magnetic tape backup systems by regularly storing and maintaining versions of changed or new files. In addition, repositories act as a replacement for offsite media storage and offsite disaster recovery systems by replicating all data that is stored in a repository that's local to a fileserver to one or more offsite repositories.

A protection policy defines how client data within the fileserver's primary disk storage system will be protected among the collection of repositories located in multiple data centers.

Each repository is made up two or more repository nodes. Repository nodes work individually to perform a variety of data management functions like compression, replication, versioning, and integrity checking and correction.

Repository nodes work collectively to perform the following inter-repository node functions:

Automate the Replacement of lost or corrupted file with files that are uncorrupted from peer repository nodes where data was previously replicated Repository nodes collectively perform capacity rebalancing to allow all nodes to assume a fairly equivalent capacity load and to increase the overall utilization of storage capacity. Without repository node capacity rebalancing, some repository nodes would run out of capacity while others nodes have excess available storage capacity

What is claimed is:

1. A method for managing integrity of a file, the method comprising:
   a) at a first time, performing a content checksum of a file in a first repository node to obtain a first checksum and storing the first checksum in the first repository node;
   b) at a second time, re-performing the content checksum on the file to obtain a second checksum and comparing the second checksum with the first checksum; and
   c) if the second checksum does not equal the first checksum, then at a node with a replica, verifying the replica;
   if the replica is verified, then transmitting the verified replica to the first repository node; and
   replacing the file with the verified replica;
   if the replica is not verified, determining if all other repository nodes with replicas have been checked;
   if not, then selecting a node with an alternative replica that has not been verified and verifying the alternative replica;
   if the alternative replica is verified, then transmitting the verified alternative replica to the first repository node; and
   replacing the file with the verified alternative replica;
   if all other repository nodes with replicas have been checked and no verified replicas have been discovered, then determining that file integrity correction failed.

2. The method of claim 1 wherein the file is a first file and wherein the method further comprises:
   if at least one of a file, a replica, and an alternative replica is verified, then determining if all relevant files have received integrity management;
   if all relevant files have received integrity management, then determining that integrity management is complete;
   if not, then recursively setting the file equal to the next file and performing (a)–(c) on the next file until all relevant files have received integrity management.

3. The method of claim 1 wherein verifying the replica comprises performing a content checksum on the replica to obtain a replica checksum and determining whether the replica checksum equals the first checksum.

4. A method for managing integrity of a file, the method comprising:
   a) performing a content checksum of a file in a repository node to obtain a checksum and storing the checksum in the repository node;
   b) subsequently performing the content checksum on the file to obtain another checksum and comparing the another checksum with the checksum; and
   c) if the comparison fails to indicate that the checksums are the same, recovering a copy of the file from another repository node.

5. The method of claim 4 wherein recovering a copy of the file from another repository node comprises:
   determining repository nodes that have a replica of the file; and querying the repository nodes.

6. The method of claim 5 wherein recovering a copy of the file from another repository node further comprises:
   at a node with a replica, verifying the replica;
   if the replica is verified, then transmitting the verified replica to the repository node; and
   replacing the file with the verified replica.

7. The method of claim 6 wherein verifying the replica comprises performing a content checksum on the replica to obtain a replica checksum and determining whether the replica checksum equals the checksum.

8. The method of claim 6 wherein recovering a copy of the file from another repository node further comprises:
   if the replica is not verified, determining if all other repository nodes with replicas have been checked;
   if not, then selecting a node with an alternative replica that has not been verified and verifying the alternative replica;
   if the alternative replica is verified, then transmitting the verified alternative replica to the repository node; and
   replacing the file with the verified alternative replica.

9. The method of claim 8 wherein the method further comprises:
   if all other repository nodes with replicas have been checked and no verified replicas have been discovered, then determining that file integrity correction failed.

10. The method of claim 8 wherein the file is a first file and wherein the method further comprises:
    if at least one of a file, a replica, and an alternative replica is verified, then determining if all relevant files have received integrity management;
    if all relevant files have received integrity management, then determining that integrity management is complete;
    if not, then recursively setting the file equal to the next file and performing (a)–(c) on the next file until all relevant files have received integrity management.

11. The method of claim 4 wherein the checksum is an MID5 checksum.

12. A data protection system comprising:
    a primary repository node having:
       a data mover operative to manage the transfer of data;

a primary repository API in communication with the data mover and operative to communicate with a network;

a primary repository file transfer module in communication with the data mover and operative to receive files;

an integrity service operative to:

perform a content checksum of a file in a repository node to obtain a checksum and to store the checksum in the primary repository node, and subsequently perform the content checksum on the file to obtain another checksum and to compare the another checksum with the checksum, and if the comparison fails to indicate that the checksums are the same, output a file recovery request; and a replicator service in communication with the data mover and the integrity service, the replicator service operative to receive the recovery request from the integrity service and to manage the process of recovering a copy of the file from another repository node.

13. A method for managing integrity of a file, the method comprising obtaining a checksum of a file at a repository node;

performing a content checksum of a replica of said file to obtain a replica checksum at another repository node;

comparing said replica checksum with said checksum of said file;

if said comparison fails to indicate that said replica checksum and said checksum of said file are the same, performing a content checksum of another replica at a repository node other than said repository node and said another repository node;

if said comparison indicates that said replica checksum and said checksum of said file are the same, transmitting said replica from said another repository node to said repository node.

14. A data protection system, comprising a repository node coupled to another repository node;

said repository node is configured to obtain a checksum of said file;

said another repository node is configured to perform a content checksum of a replica of said file to obtain a replica checksum at another repository node;

compare said replica checksum with said checksum of said file;

if said comparison fails to indicate that said replica checksum and said checksum of said file are the same, perform a content checksum of another replica at a repository node other than said repository node and said another repository node;

if said comparison indicates that said replica checksum and said checksum of said file are the same, transmit said replica from said another repository node to said repository node.

* * * * *